United States Patent
Machida et al.

(10) Patent No.: US 11,724,380 B2
(45) Date of Patent: Aug. 15, 2023

(54) POWER TOOL AND HOOK

(71) Applicant: MAKITA CORPORATION, Anjo (JP)

(72) Inventors: Yoshitaka Machida, Anjo (JP); Monthana Chutimarungsan, Chonburi (TH); Julalak Chompurak, Chonburi (TH)

(73) Assignee: MAKITA CORPORATION, Anjo (JP)

( * ) Notice: Subject to any disclaimer, the term of this patent is extended or adjusted under 35 U.S.C. 154(b) by 272 days.

(21) Appl. No.: 17/270,088

(22) PCT Filed: Aug. 6, 2019

(86) PCT No.: PCT/JP2019/031001
§ 371 (c)(1),
(2) Date: Feb. 22, 2021

(87) PCT Pub. No.: WO2020/070972
PCT Pub. Date: Apr. 9, 2020

(65) Prior Publication Data
US 2021/0205977 A1   Jul. 8, 2021

(30) Foreign Application Priority Data
Oct. 5, 2018   (JP) .................. 2018-189891

(51) Int. Cl.
*B25F 5/02* (2006.01)
*B25H 3/00* (2006.01)
(52) U.S. Cl.
CPC .............. *B25F 5/02* (2013.01); *B25H 3/00* (2013.01)

(58) Field of Classification Search
CPC ...................................... B25F 5/006
See application file for complete search history.

(56) References Cited

U.S. PATENT DOCUMENTS 4,787,145 A * 11/1988 Klicker ............... B27B 9/00
30/388
5,850,698 A * 12/1998 Hum ................. B27B 9/00
30/377
5,924,667 A * 7/1999 Grahn ............. F21V 21/0832
248/690

(Continued)

FOREIGN PATENT DOCUMENTS

EP   1 918 053 A2   5/2008
EP   3434421 A1 *  1/2019 ............ B25F 5/02

(Continued)

OTHER PUBLICATIONS

Mar. 23, 2021 International Preliminary Report on Patentability issued in International Patent Application No. PCT/JP2019/031001.

(Continued)

*Primary Examiner* — Nathaniel C Chukwurah
*Assistant Examiner* — Lucas E. A. Palmer
(74) *Attorney, Agent, or Firm* — Oliff PLC

(57) ABSTRACT

A power tool and a hook can withstand a shock load applied when being suspended. The hook includes a hook body, a hook support supporting the hook body, and a shock absorber that is compressible and located between the hook body and the hook support to absorb shock on the hook body.

19 Claims, 12 Drawing Sheets

(56) References Cited

U.S. PATENT DOCUMENTS

| | | | |
|---|---|---|---|
| 8,308,034 B2* | 11/2012 | Shibata | B25F 5/02 224/904 |
| 8,534,375 B2* | 9/2013 | Matsumoto | B25F 5/02 173/171 |
| 9,457,461 B2* | 10/2016 | Francis | B23Q 13/00 |
| 10,058,986 B1* | 8/2018 | Hu | A45F 5/021 |
| 2004/0178240 A1 | 9/2004 | Bauer | |
| 2005/0015935 A1* | 1/2005 | Bader | B25F 5/02 16/430 |
| 2006/0070761 A1* | 4/2006 | Vahabi-Nejad | B25C 7/00 173/171 |
| 2008/0148915 A1 | 6/2008 | Nickels et al. | |
| 2011/0139479 A1 | 6/2011 | Nagasaka et al. | |
| 2012/0292472 A1* | 11/2012 | Segura | F16M 13/022 248/225.21 |
| 2015/0343617 A1* | 12/2015 | Kondo | B25B 21/02 173/93 |
| 2017/0021490 A1* | 1/2017 | Francis | A61K 47/58 |
| 2017/0119137 A1 | 5/2017 | Cirincione, II et al. | |
| 2018/0099399 A1 | 4/2018 | Sunabe et al. | |

FOREIGN PATENT DOCUMENTS

| | | | |
|---|---|---|---|
| JP | S54-084900 U | | 6/1979 |
| JP | S58-120587 U | | 8/1983 |
| JP | S59-087351 U | | 6/1984 |
| JP | 2004-090216 A | | 3/2004 |
| JP | 2006-326753 A | | 12/2006 |
| JP | 2006326753 A | * | 12/2006 |
| JP | 2011-140110 A | | 7/2011 |
| JP | 2016-023447 A | | 2/2016 |
| JP | 2018-058190 A | | 4/2018 |

OTHER PUBLICATIONS

Oct. 15, 2019 Search Report issued in International Patent Application No. PCT/JP2019/031001.

Jun. 7, 2022 Office Action issued in Japanese Patent Application No. 2018-189891.

Sep. 13, 2022 Office Action issued in Japanese Patent Application No. 2018-189891.

* cited by examiner

POWER TOOL AND HOOK

FIELD

The present invention relates to a power tool and a hook.

BACKGROUND

Various measures have been taken to prevent a power tool from falling during work at an elevated site. U.S. Patent Application Publication No. 2017/0119137 (hereafter, Patent Literature 1) describes a strap 202 that includes a tension spring 240 and is attachable in a loop shape to a housing (not shown) of a power tool body (or a grinder body, not shown) (refer to FIG. 12). After one end of a cord (or a rope or a wire, not shown) passes through a loop of the strap 202 attached to the power tool body, the two ends of the cord can be fixed to a hook portion (e.g., a handrail or a scaffold, not shown) at an elevated working site. In other words, the strap 202 attached to the power tool body can be tethered to a hook portion at an elevated working site with a cord. When, for example, a manually held power tool body is dropped accidentally, the power tool body is suspended from the hook portion at the elevated working site with the cord. Thus, the power tool body is prevented from falling on the ground.

BRIEF SUMMARY

Technical Problem

However, with the technique described in Patent Literature 1, the housing of the power tool body and/or an attachment portion 230 of the strap 202 attached to the housing of the power tool body may break under the shock load from the dropped power tool that is suspended from the hook portion at the elevated working site with the cord.

One or more aspects of the present invention are directed to a power tool and a hook that withstand a shock load applied when being suspended.

Solution to Problem

A first aspect of the present invention provides a hook, including:
  a hook body;
  a hook support supporting the hook body; and
  a shock absorber being compressible and located between the hook body and the hook support to absorb shock on the hook body.

A second aspect of the present invention provides a power tool, including:
  a power tool body including
    a body housing,
    a motor housing attached to a lower portion of the body housing,
    a hand grip attached to a rear portion to connect the body housing and the motor housing, and
    a battery mount attached to a lower portion to connect the motor housing and the hand grip; and
  a hook attachable to and detachable from the power tool body, the hook including
    a hook body,
    a hook support supporting the hook body, and
    a shock absorber being compressible and located between the hook body and the hook support to absorb shock on the hook body.

DETAILED DESCRIPTION

First Embodiment

Figure 1:
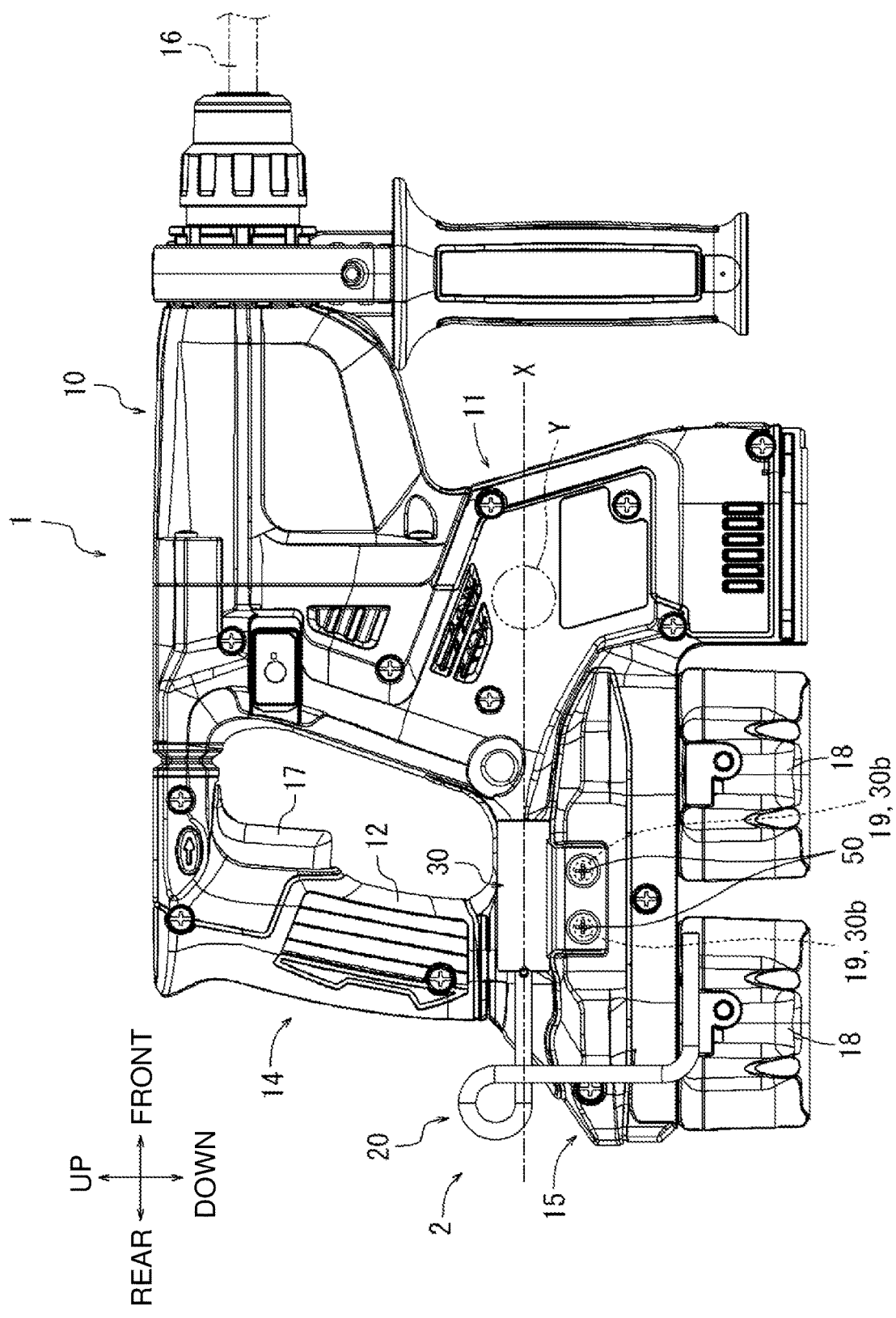
FIG. 1 is a side view of a hammer drill according to a first embodiment with a hook body retracted.

Embodiments of the present invention will now be described with reference to the drawings. A first embodiment will now be described with reference to FIGS. 1 to 8. A hammer drill 1 will be described below as an example of a power tool. Hereafter, up, down, front, rear, right, and left refer to upward, downward, frontward, rearward, rightward, and leftward directions in the drawings described above. More specifically, the frontward direction refers to the direction toward a distal end of the hammer drill 1 (direction in which a drill bit 16 extends). The same applies to a second embodiment described later.

The hammer drill 1 and a hook 2 attached to a battery mount 15 of the hammer drill 1 will first be described separately.

The hammer drill 1 will now be described (refer to FIGS. 1 to 4). The hammer drill 1 includes a body housing 10, a motor housing 11, a hand grip 14, and the battery mount 15. The body housing 10 defines an outer wall of the hammer drill 1. The motor housing 11 is attached to a lower portion of the body housing 10. The hand grip 14 is attached to a rear portion to connect the body housing 10 and the motor housing 11. The battery mount 15 is attached to a lower portion to connect the motor housing 11 and the hand grip 14.

The body housing 10 incorporates an impact mechanism (not shown) and a rotating mechanism (not shown). The impact mechanism converts a rotational force of an output shaft (not shown) of a motor (not shown) to a striking force on the drill bit 16. The rotating mechanism converts the rotational force of the motor output shaft to a rotational force on the drill bit 16.

The motor housing 11 incorporates the motor (not shown) with the output shaft (not shown) oriented upward.

The hand grip 14 has a handle 12 gripped by an operator. A trigger 17 is attached to the hand grip 14. The trigger 17 is pulled by an operator to turn on an internal switch (not shown).

Two battery packs 18, serving as power sources, are attached on the battery mount 15 to align in the front-rear direction. The battery mount 15 has two screw holes (not shown) for attachment of the hook 2 (described later).

The operator gripping the handle 12 pulls the trigger 17. The pull activates the internal switch to input an electric signal to a controller (not shown) incorporated in the motor housing 11. This rotates the motor output shaft. The rotational force of the motor output shaft converts to a striking force, which is transmitted to the drill bit 16 through the impact mechanism. In this manner, the drill bit 16 can perform a striking operation.

At the same time, the rotational force of the motor output shaft converts to a rotational force, which is transmitted to the drill bit 16 through the rotating mechanism. In this manner, the drill bit 16 can perform a rotational operation. The striking force and the rotational force can thus be provided to the drill bit 16 to allow the drill bit 16 to efficiently perform operations such as boring on gypsum.

The hook 2 will now be described (refer to FIGS. 5 to 8). The hook 2 includes a hook body 20, a hook support 30, and a shock absorber. The hook support 30 rotatably supports the hook body 20. The shock absorber is placed between the hook body 20 and the hook support 30 and compresses to absorb shock. The shock absorber in the present embodiment is an elastic member. More specifically, the shock absorber in the present embodiment includes an elastic piece 35 and a compression spring 40 (refer to FIGS. 5 and 6).

The hook body 20 including a first hook portion 21, a second hook portion 22, and a linear portion 23 is formed by bending a single wire (metal wire). The first hook portion 21 is substantially L-shaped. The first hook portion 21 is located on the distal end of the hook body 20. The second hook portion 22 is substantially annular. The second hook portion 22 is located in a substantially middle area (substantially middle portion) of the hook body 20 between its distal end and basal end to protrude outward. A first spring pin 25 is insertable at the basal end of the linear portion 23 (refer to FIG. 6). A second spring pin (protrusion) 26 is insertable in a substantially middle area of the linear portion 23 between its distal end and basal end.

Figure 7:
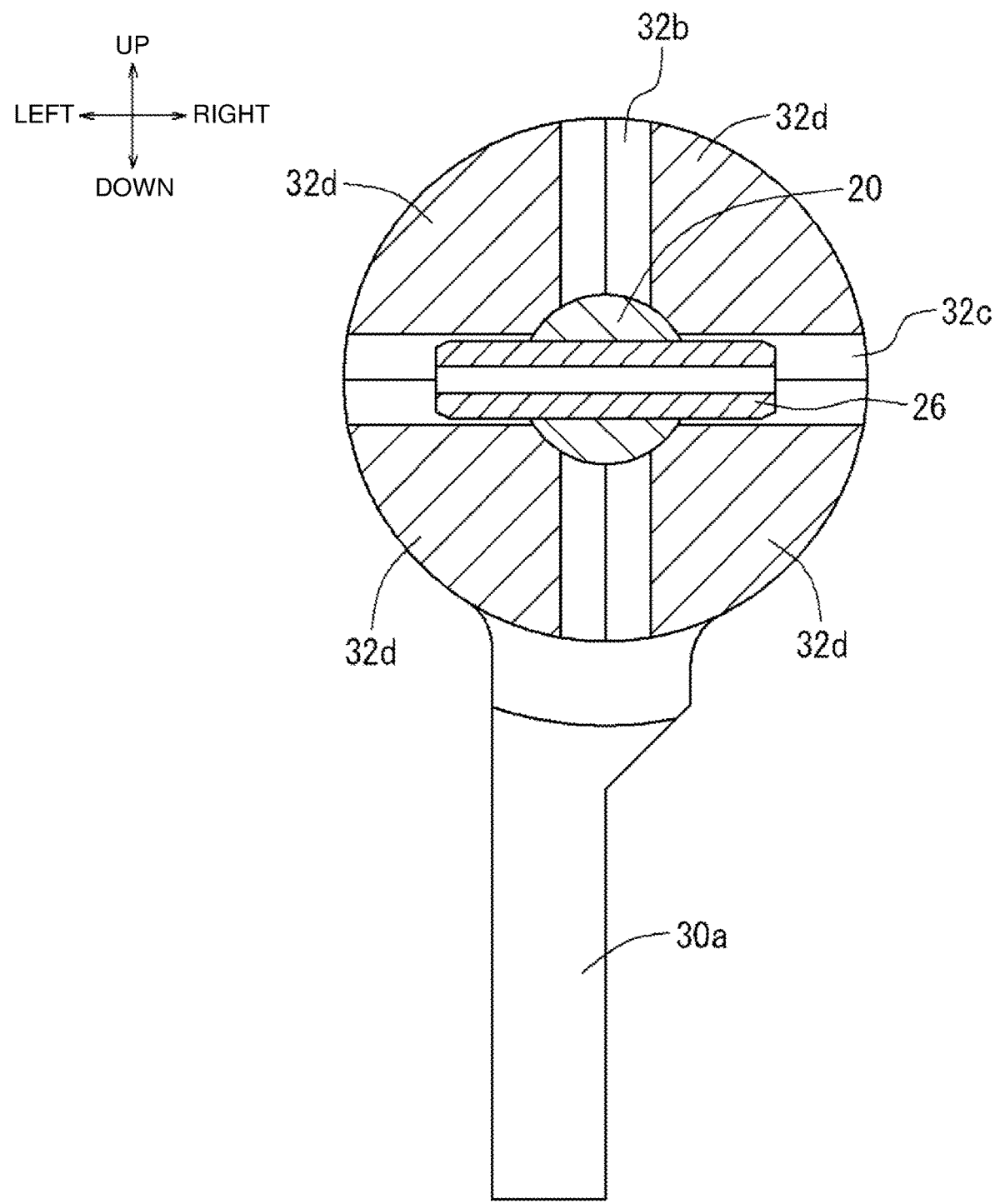
FIG. 7 is a cross-sectional view taken along line VII-VII in FIG. 6.
Figure 8:
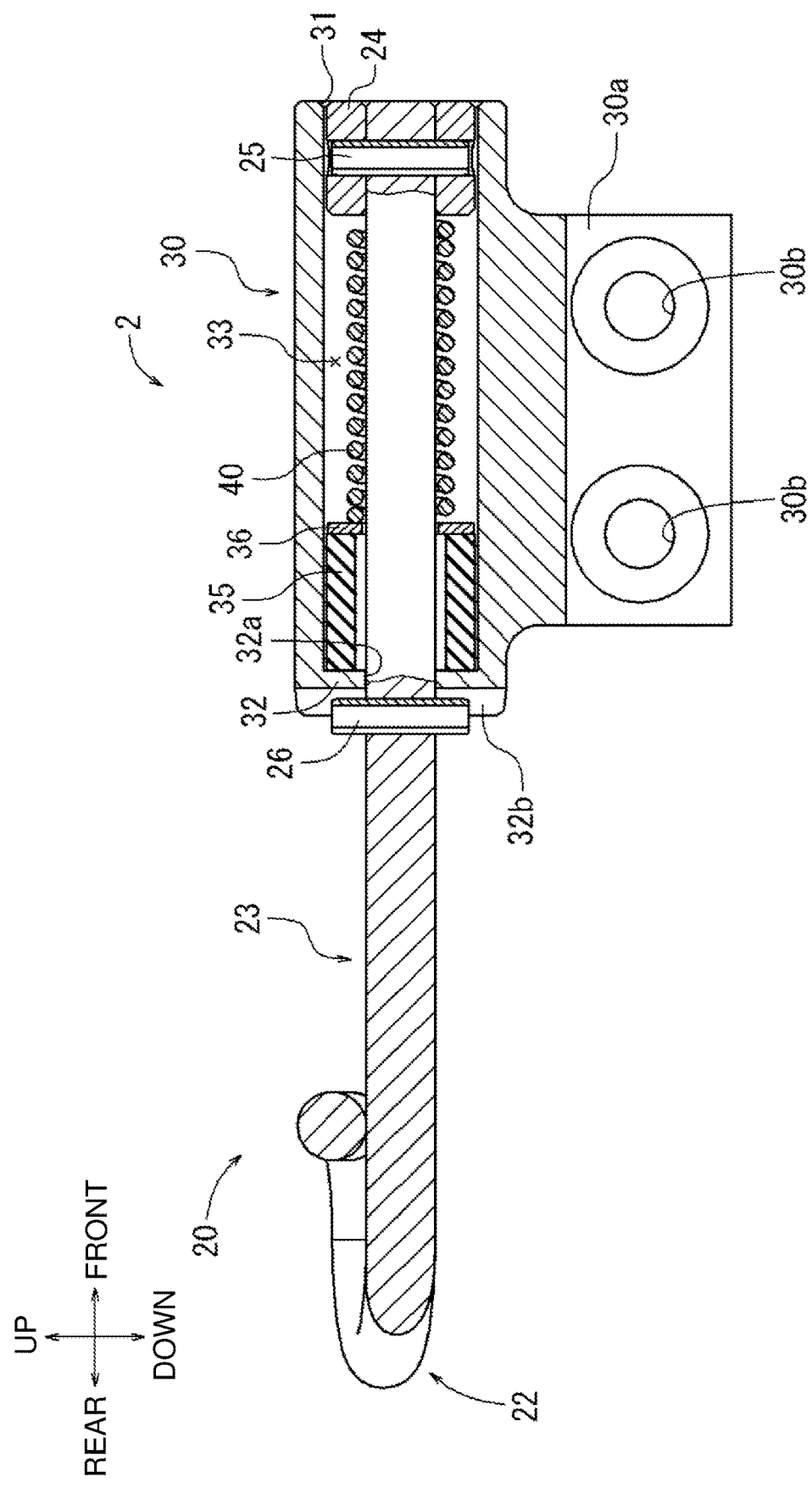
FIG. 8 is a view of the hook in FIG. 6 with the hook body pulled out.

The hook support 30 is substantially cylindrical. The hook support 30 has an opening 31 at its one end and a wall 32 at its other end. The wall 32 closes the hook support 30. The hook support 30 has an attachment portion 30a having two insertion holes 30b, which can receive screws 50. The wall 32 has a through-hole 32a, through which the hook body 20 is insertable. The wall 32 has, on its outer surface, a V-shaped (inclined) first notch groove (recess) 32b and a V-shaped (inclined) second notch groove (recess) 32c. The first notch groove 32b extends vertically. The second notch groove 32c extends laterally. The first notch groove 32b and the second notch groove 32c are thus orthogonal to each other as shown in FIG. 7.

An example procedure for assembling the hook 2 will now be described. First, the elastic piece 35, a washer 36, and the compression spring 40 are sequentially inserted into an internal space 33 of the hook support 30 through the opening 31. Subsequently, the basal end of the linear portion 23 is inserted into the through-hole 32a, the elastic piece 35, the washer 36, and the compression spring 40 in this order, and then pushed out of the opening 31. A spring stopper 24 is then received on the basal end of the protruding linear portion 23.

The first spring pin 25 is then inserted to fix the spring stopper 24 to the basal end of the linear portion 23. The linear portion 23 is then pulled out from the hook support 30 against the urging force from the compression spring 40. The second spring pin 26 is then inserted into the pulled linear portion 23. Finally, the pulled linear portion 23 is released, and the second spring pin 26 is fitted into the second notch groove 32c. The hook 2 is assembled in this manner.

The two screws 50 are inserted into the two insertion holes 30b in the assembled hook 2 and are then screwed into two screw holes 19 in the battery mount 15. In this manner, the hook 2 can be attached to the battery mount 15. In other words, the hook support 30 of the hook 2 is attachable to and detachable from the battery mount 15 of the hammer drill 1.

Figure 2:
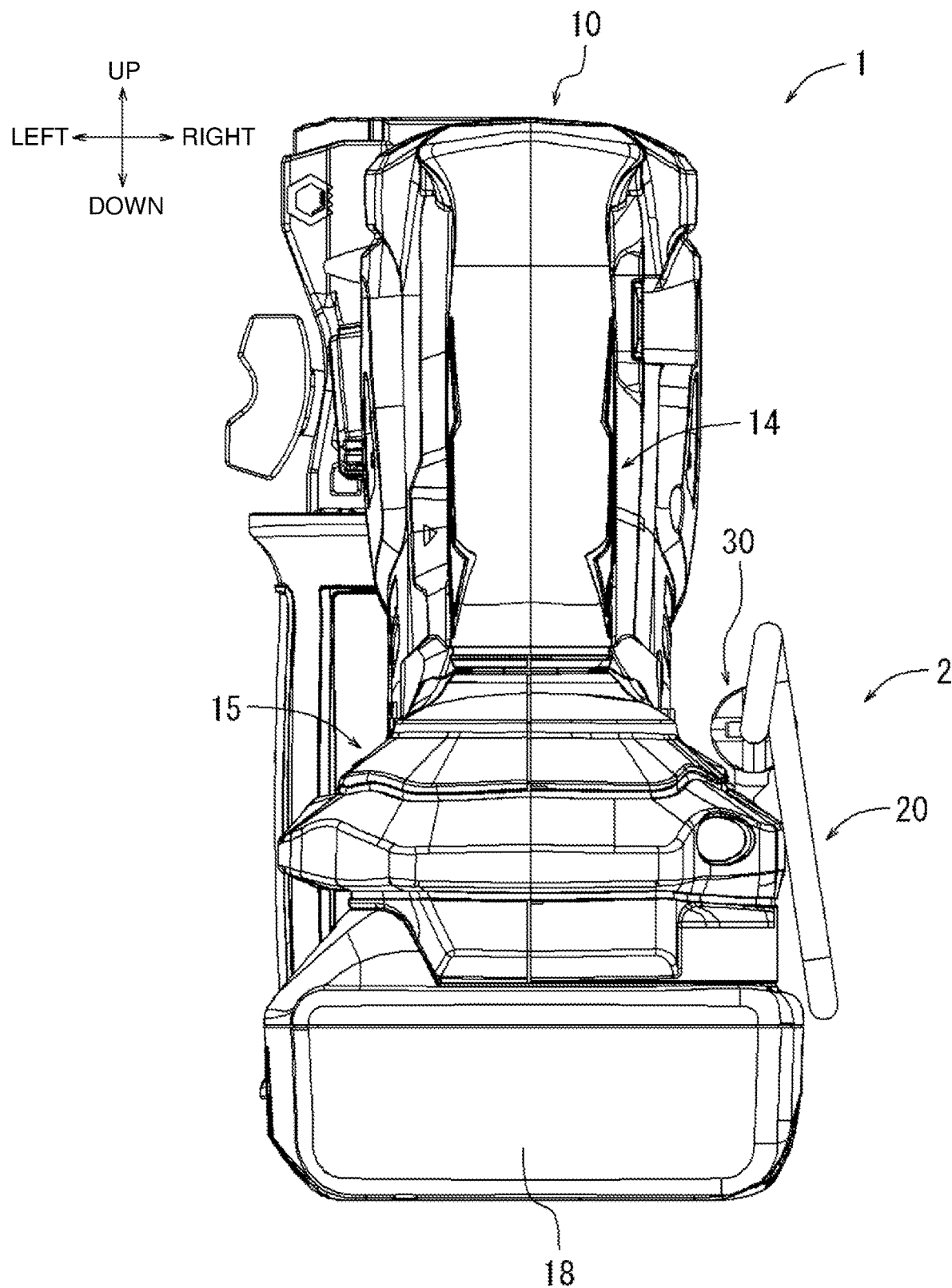
FIG. 2 is a rear view of the hammer drill in FIG. 1.
Figure 3:
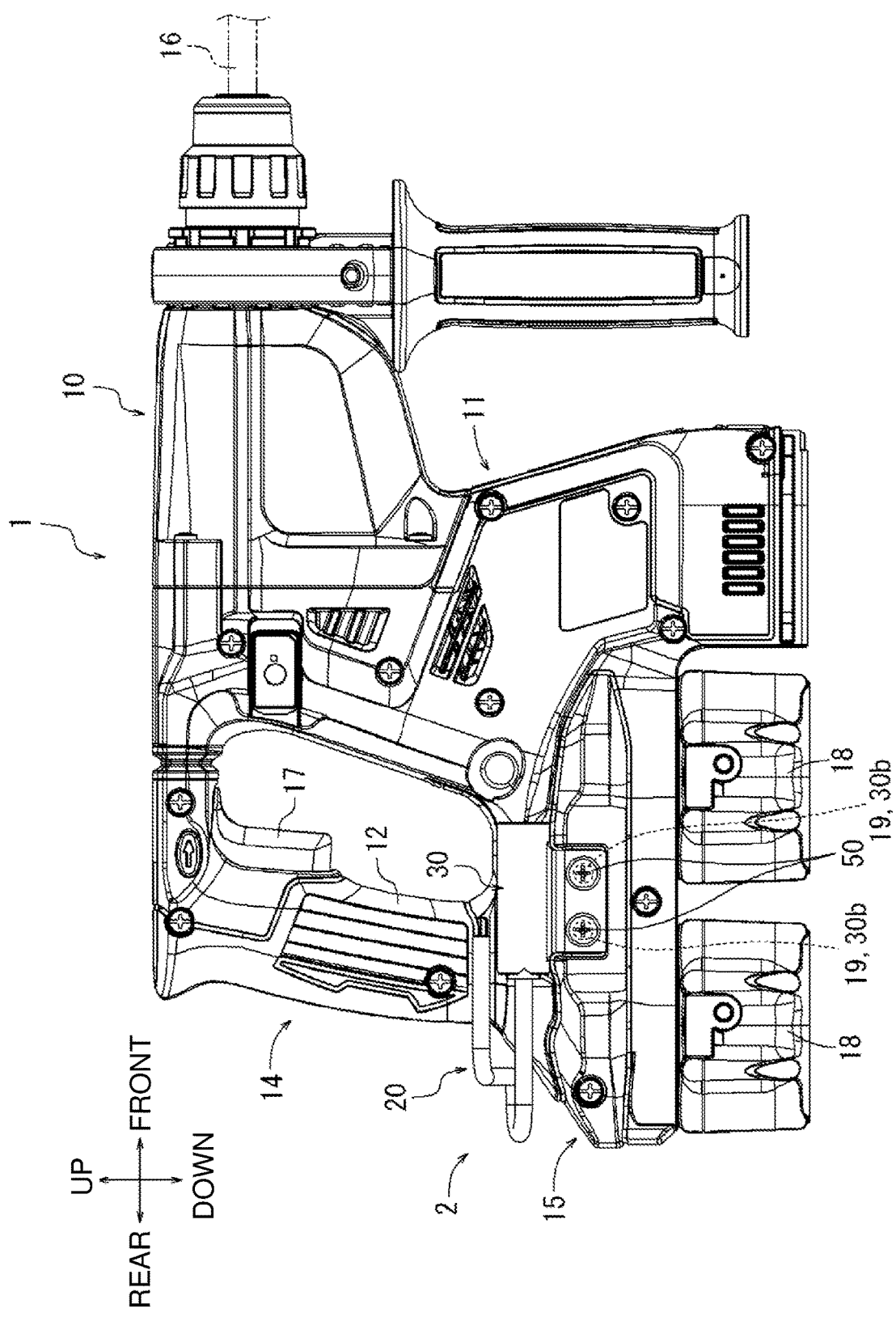
FIG. 3 is a view of the hammer drill in FIG. 1 with the hook body pulled out.
Figure 4:
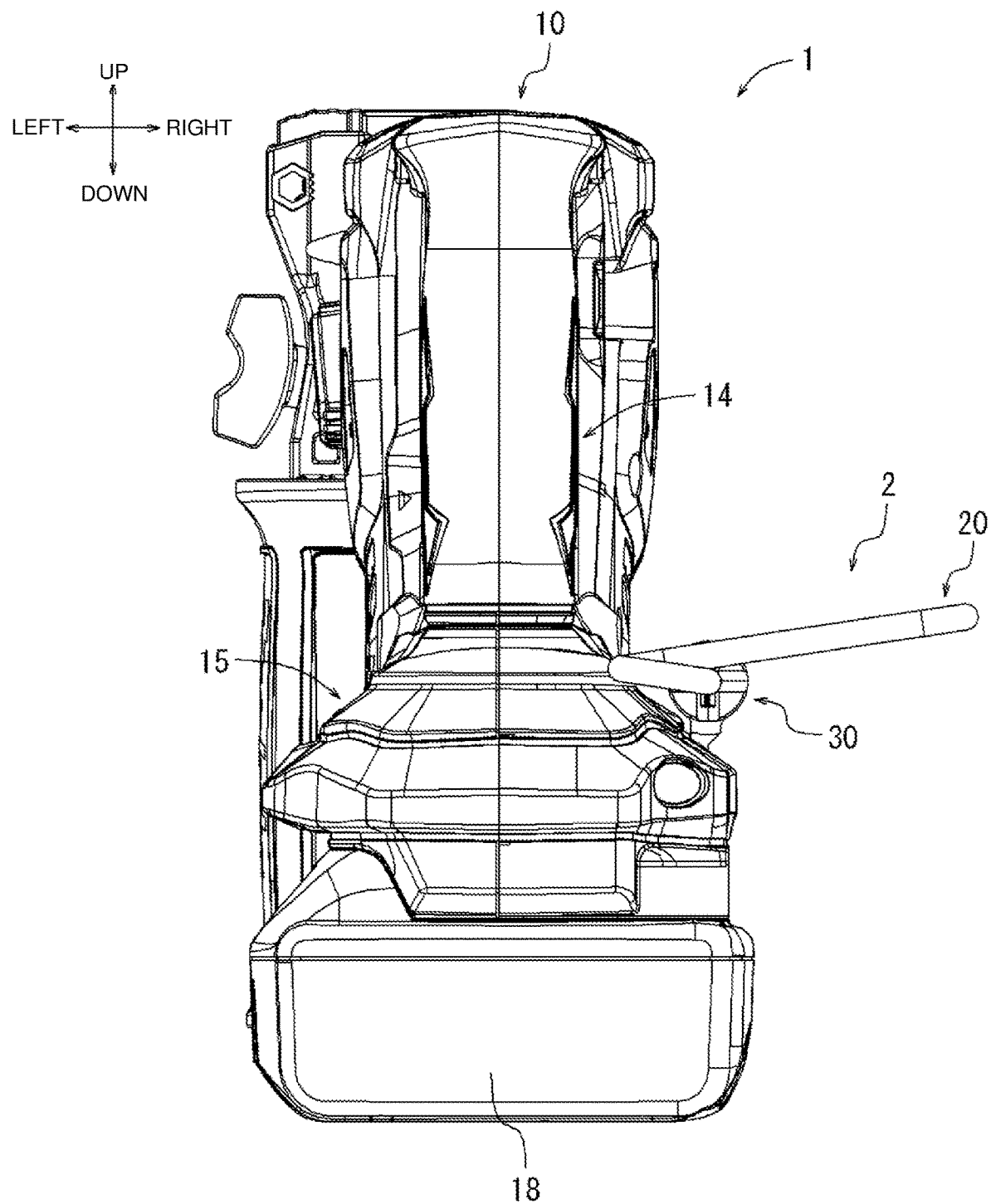
FIG. 4 is a rear view of the hammer drill in FIG. 3.
Figure 5:
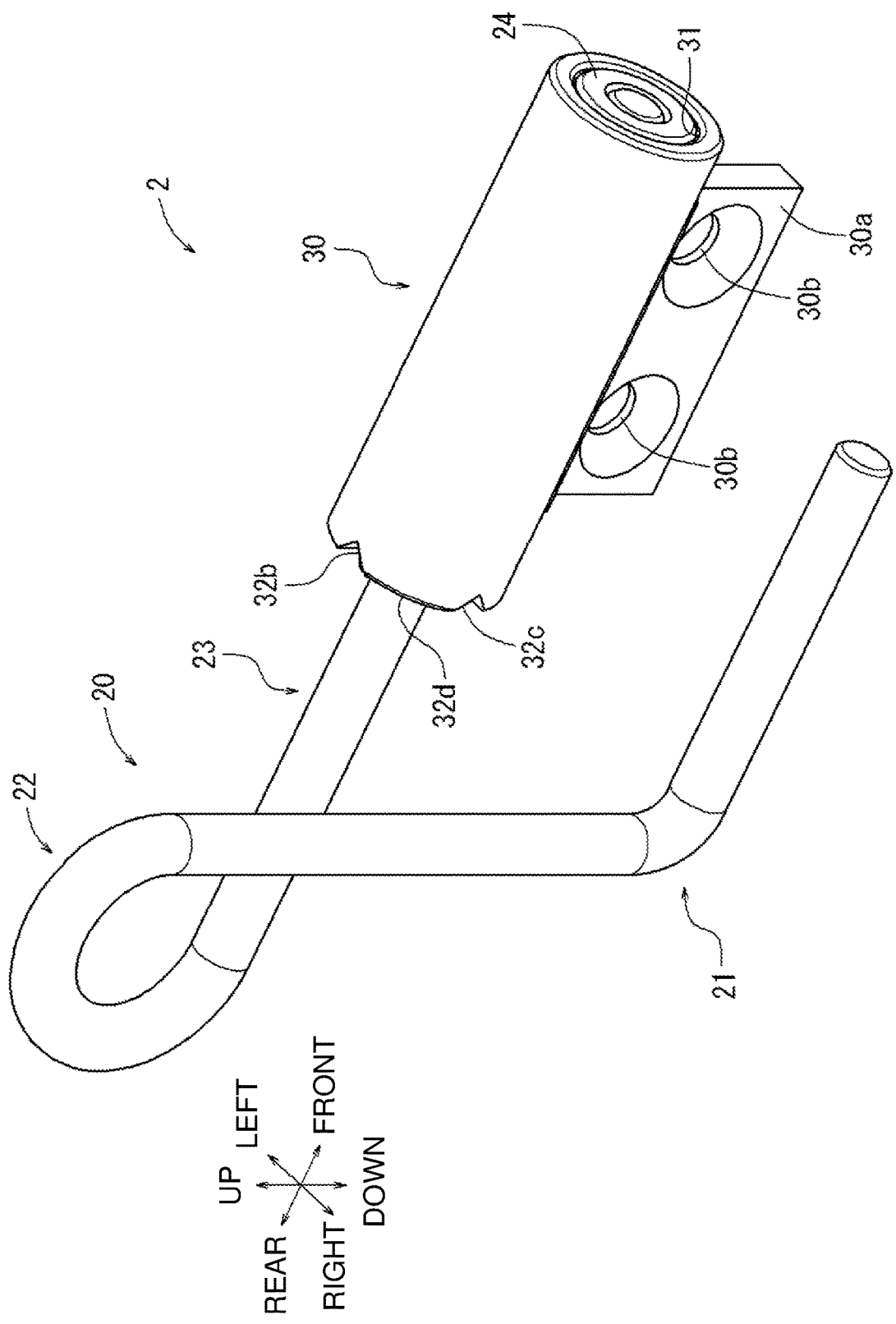
FIG. 5 is an overall perspective view of a hook in FIG. 1.
Figure 6:
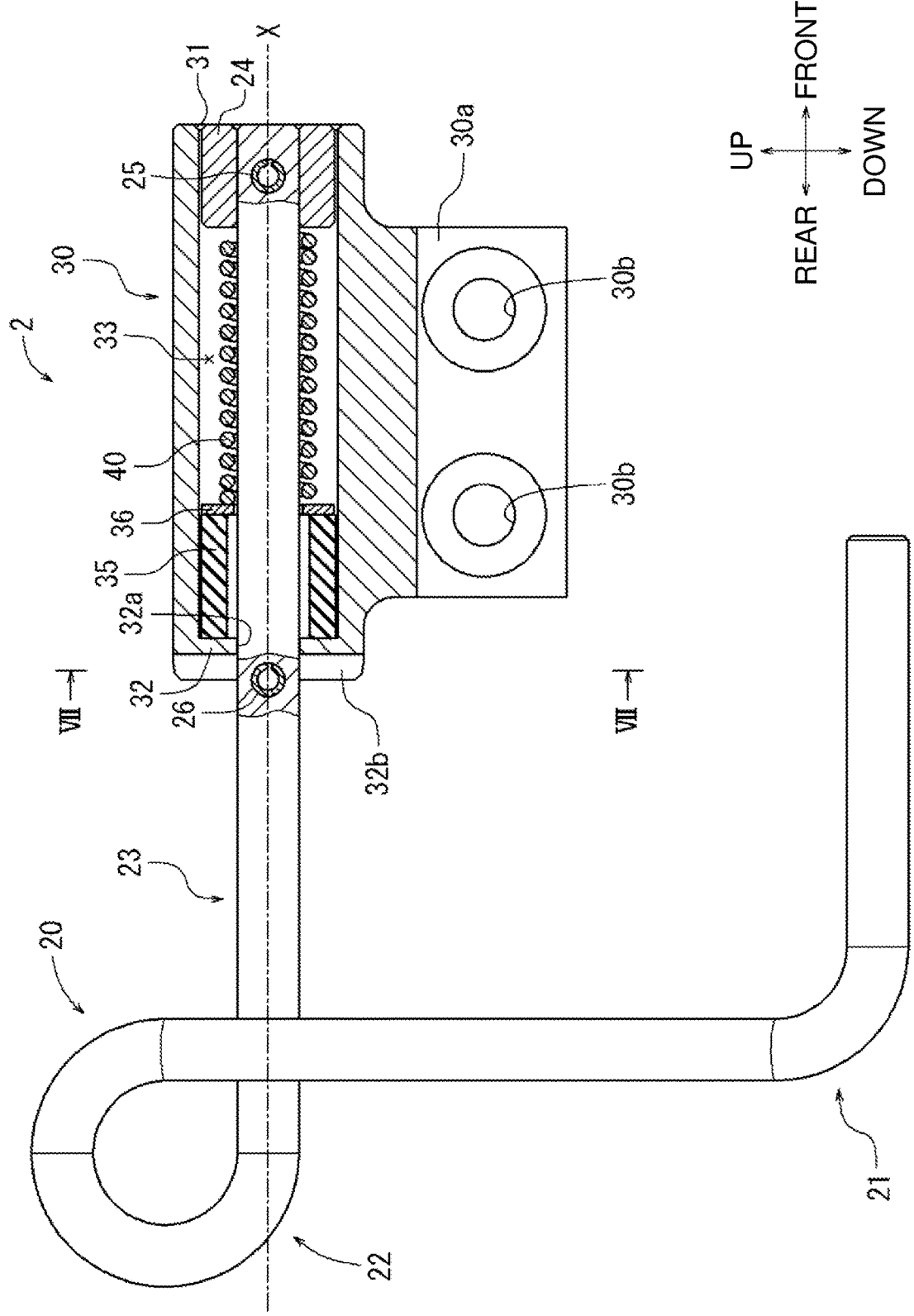
FIG. 6 is a longitudinal sectional view of FIG. 5.

The hook body 20 of the hook 2 attached in this manner remains retracted (in a retracted state) (refer to FIGS. 1, 2, and 6). Thus, the hook body 20 is to be switched to the state of being pulled out (use-ready state) when one end of a cord is hooked on the hook body 20. In this case, the hook body 20 is first rotated about its axis relative to the hook support 30.

The second spring pin 26 in the linear portion 23 then moves over the sloping surface of the second notch groove 32c against the urging force from the compression spring 40 and is placed on flat portions 32d. The hook body 20 is rotated further about its axis relative to the hook support 30. The second spring pin 26 in the rotated linear portion 23 is then fitted into the first notch groove 32b on the hook support 30 under the urging force from the compression spring 40. Thus, the hook body 20 can be switched to the pulled-out state (refer to FIGS. 3, 4, and 8).

The hook body 20 in the pulled-out state is reversely rotated about its axis relative to the hook support 30 in the state-switching operation described above and thus can return to the retracted state.

The advantageous effects of the hook 2 will now be described. In the same manner as with the known technique described above, the hammer drill 1 can be prevented from falling during work at an elevated site with a cord having one end first placed through the second hook portion 22 of the hook 2 attached to the hammer drill 1 and the two ends then fixed to a hook portion at an elevated working site. In other words, the second hook portion 22 of the hook 2 attached to the hammer drill 1 can be tethered to the hook portion at the elevated working site with the cord.

When, for example, the manually held hammer drill 1 is dropped accidentally, the hammer drill 1 is suspended from the hook portion at the elevated working site with the cord. The hammer drill 1 is prevented from falling on the ground. When the dropped hammer drill 1 is suspended from the hook portion at the elevated working site with the cord, the hook body 20 is pulled out from the hook support 30.

In this state, the hook body 20 receives a shock load applied away from the hook support 30. However, the elastic piece 35 and the compression spring 40 compress and thus absorb the shock load. In other words, the hammer drill 1 withstands a shock load applied when being suspended. This prevents the hook support 30 of the hook 2 and/or the battery mount 15 of the hammer drill 1 from being damaged. In a side view of the hammer drill 1, the hook 2 is attached to the battery mount 15 with an axis X of the elastic piece 35 and the compression spring 40 passing through a center of gravity Y of the hammer drill 1 (refer to FIGS. 1 and 6). The shock load applied on the hammer drill 1 being suspended can thus be absorbed smoothly.

The hook 2 is attached to the battery mount 15 of the hammer drill 1 according to the first embodiment. The hook 2 includes the hook body 20, the hook support 30 supporting the hook body 20, and the shock absorber (the elastic piece 35 and the compression spring 40) that compresses between the hook body 20 and the hook support 30 to absorb shock on the hook body 20. The advantageous effects of the hook 2 described above are thus achieved. In other words, the hammer drill 1 withstands a shock load applied when being suspended. This prevents the hook support 30 of the hook 2 and/or the battery mount 15 of the hammer drill 1 from being damaged.

The hook support 30 in the present embodiment is attachable to and detachable from the battery mount 15. Thus, the hook 2 can be retrofitted to the hammer drill 1. The hammer drill 1 with this structure can be sold in two modes, that is, a hammer drill 1 incorporating a hook 2, and a hammer drill 1 being separate from a retrofittable hook 2.

The hook 2 in the present embodiment includes the hook body 20, the hook support 30 supporting the hook body 20, and the shock absorber (the elastic piece 35 and the compression spring 40) that compresses between the hook body 20 and the hook support 30 to absorb shock. The advantageous effects of the hook 2 described above are thus achieved.

The shock absorber in the present embodiment includes an elastic member. The shock absorber including the simple material thus withstands a shock load.

The elastic member in the present embodiment includes the elastic piece 35 and the compression spring 40. Thus, although the compression spring 40 compresses completely while absorbing shock, the elastic piece 35 continues to absorb the shock. The shock can thus be absorbed reliably.

The hook body 20 in the present embodiment is rotatable relative to the hook support 30. When the hook body 20 is rotated about its axis relative to the hook support 30, the second spring pin 26 in the rotated linear portion 23 is fitted into the first notch groove 32b under the urging force from the compression spring 40. The hook body 20 is thus switched to the pulled-out state. The hook body 20 in the pulled-out state can return to the retracted state in a similar manner. Thus, the hook body 20 offers a ratcheting feel when switched between the pulled-out state and the retracted state.

The hook body 20 in the present embodiment includes the first hook portion 21 and the second hook portion 22 shaped differently from the first hook portion 21. The first hook portion 21 or the second hook portion 22 can thus be selectively used in accordance with the shape of a hook portion on which the hook body 20 is to be hooked. For example, the first hook portion 21 is substantially L-shaped, and the second hook portion 22 is substantially annular. To hook the hook body 20 on a stepladder, the first hook portion 21 may be used. To hook the hook body 20 on a cord or a carabiner, the second hook portion 22 may be used.

The first hook portion 21 and the second hook portion 22 in the present embodiment are formed by bending a single wire. The first hook portion 21 and the second hook portion 22 can thus be easily formed.

Second Embodiment

Figure 9:
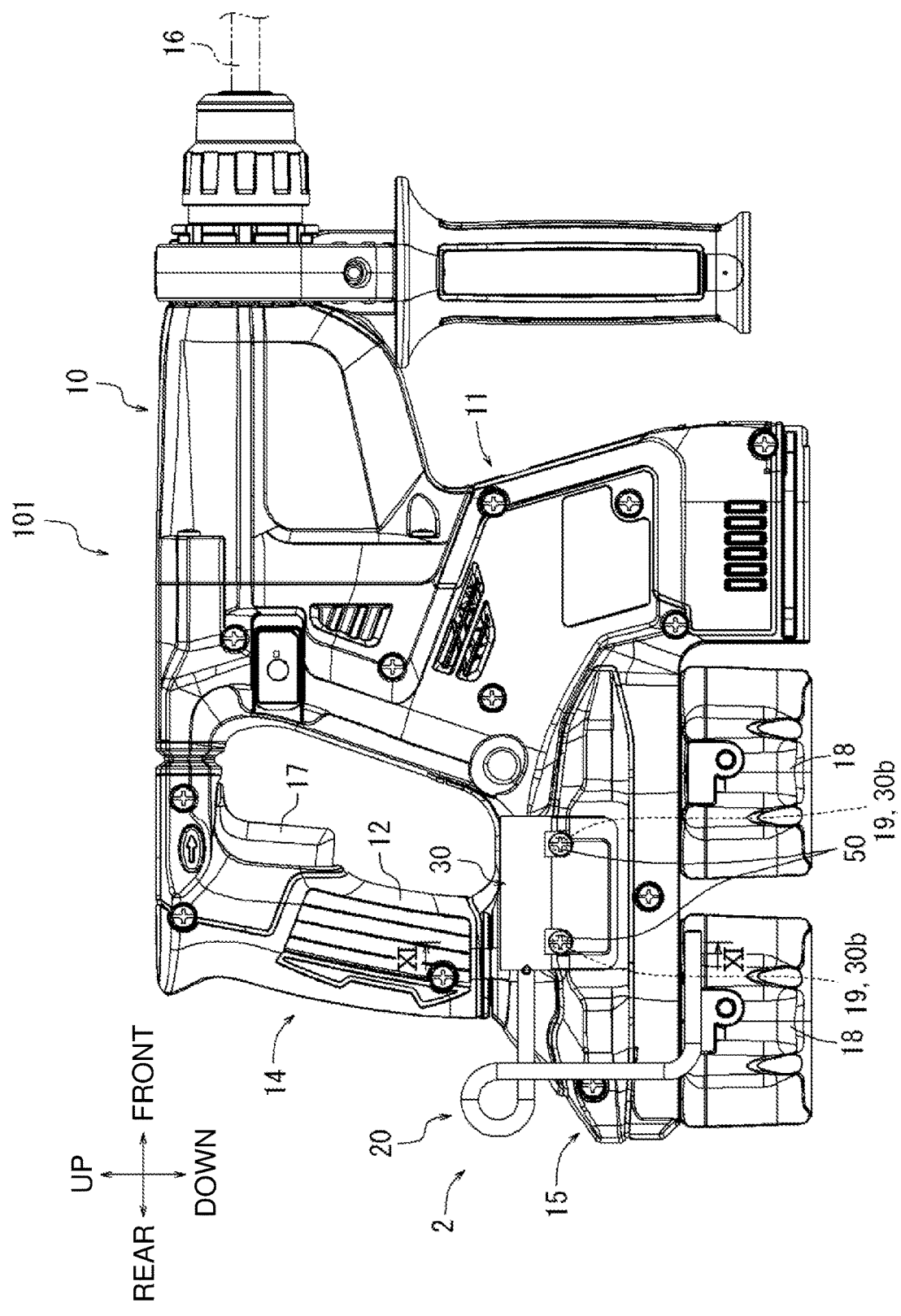
FIG. 9 is a side view of a hammer drill according to a second embodiment with a hook body retracted.
Figure 10:
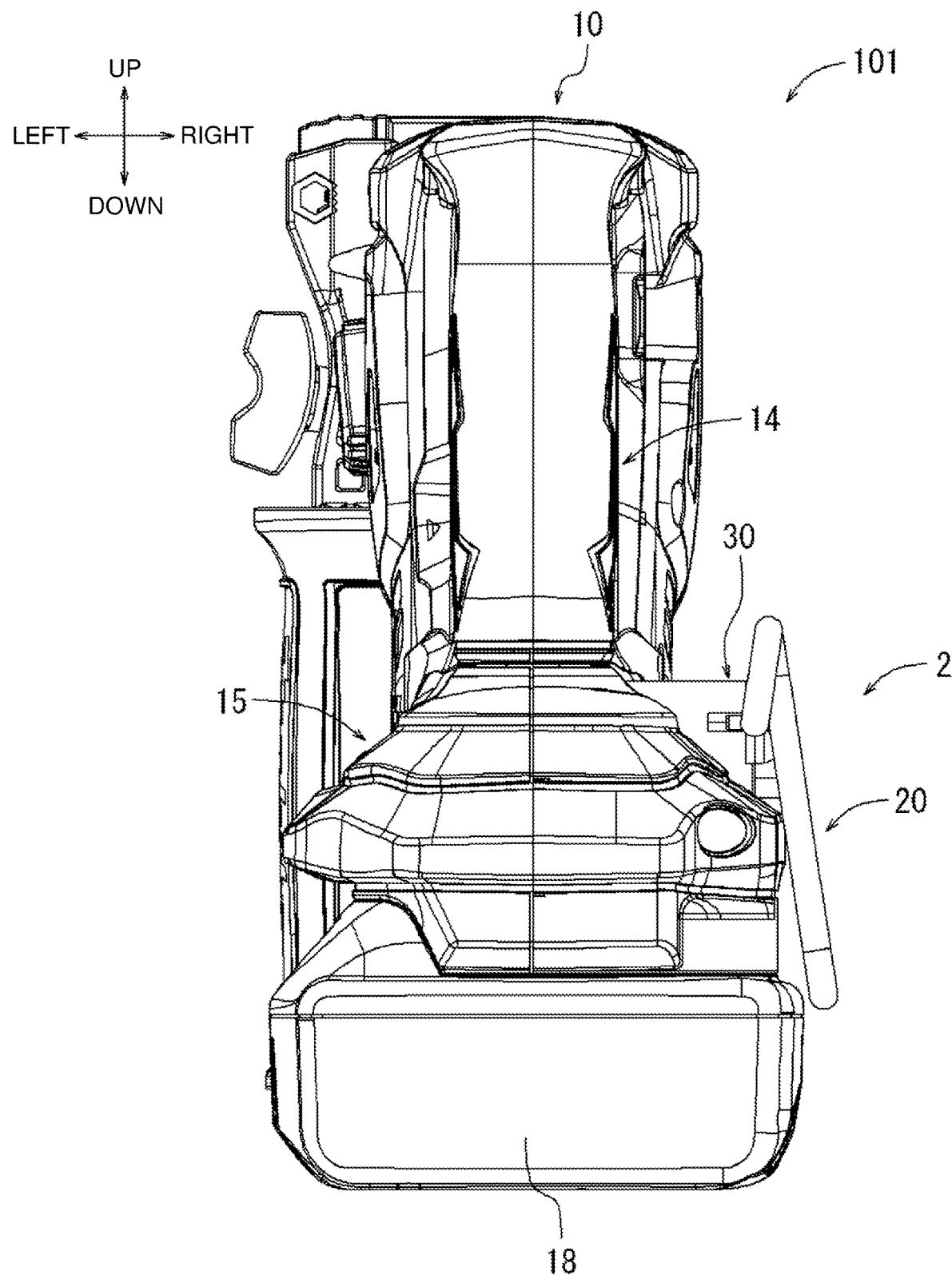
FIG. 10 is a rear view of the hammer drill in FIG. 9.
Figure 11:
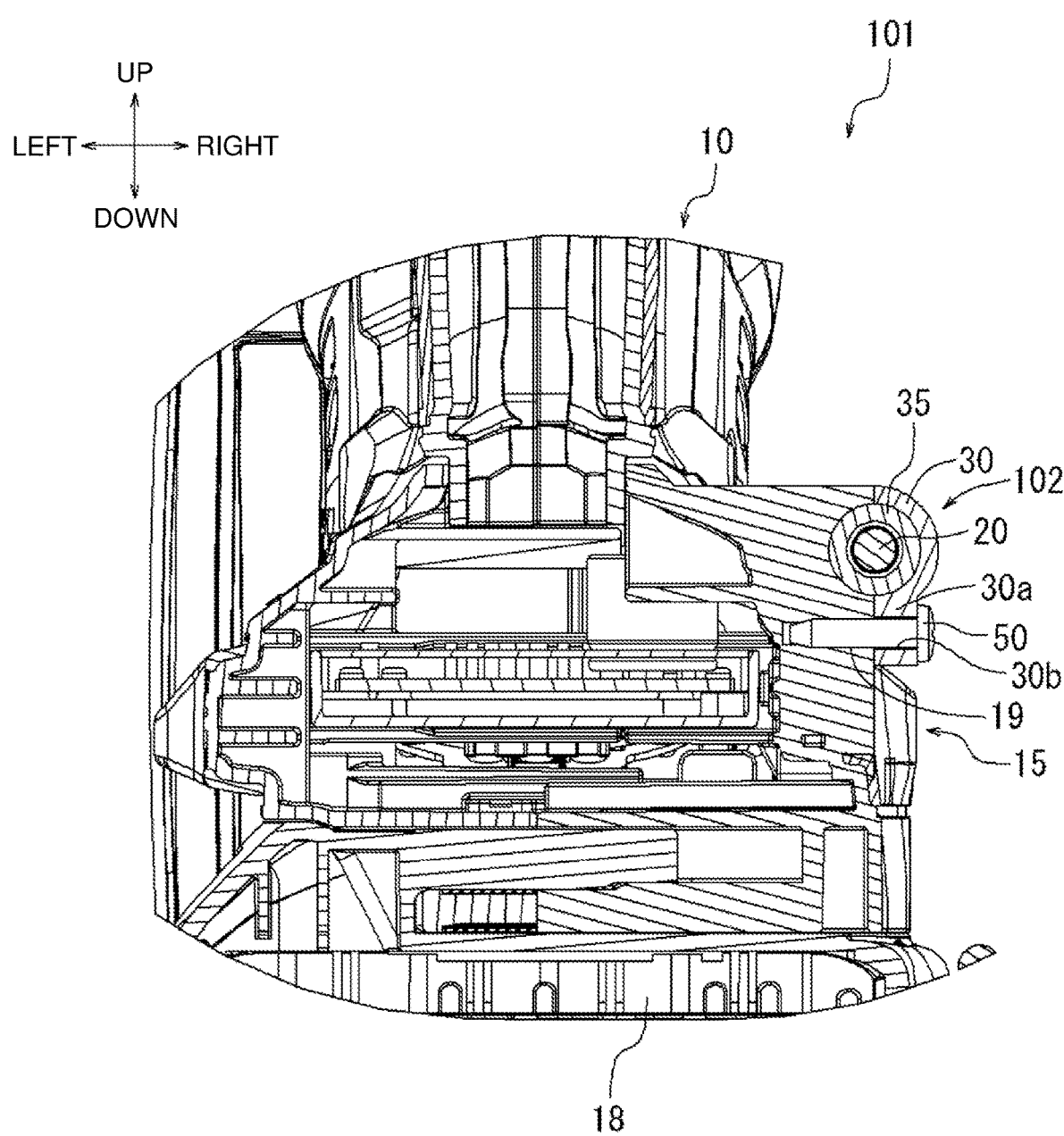
FIG. 11 is a cross-sectional view taken along line XI-XI in FIG. 9.
Figure 12:
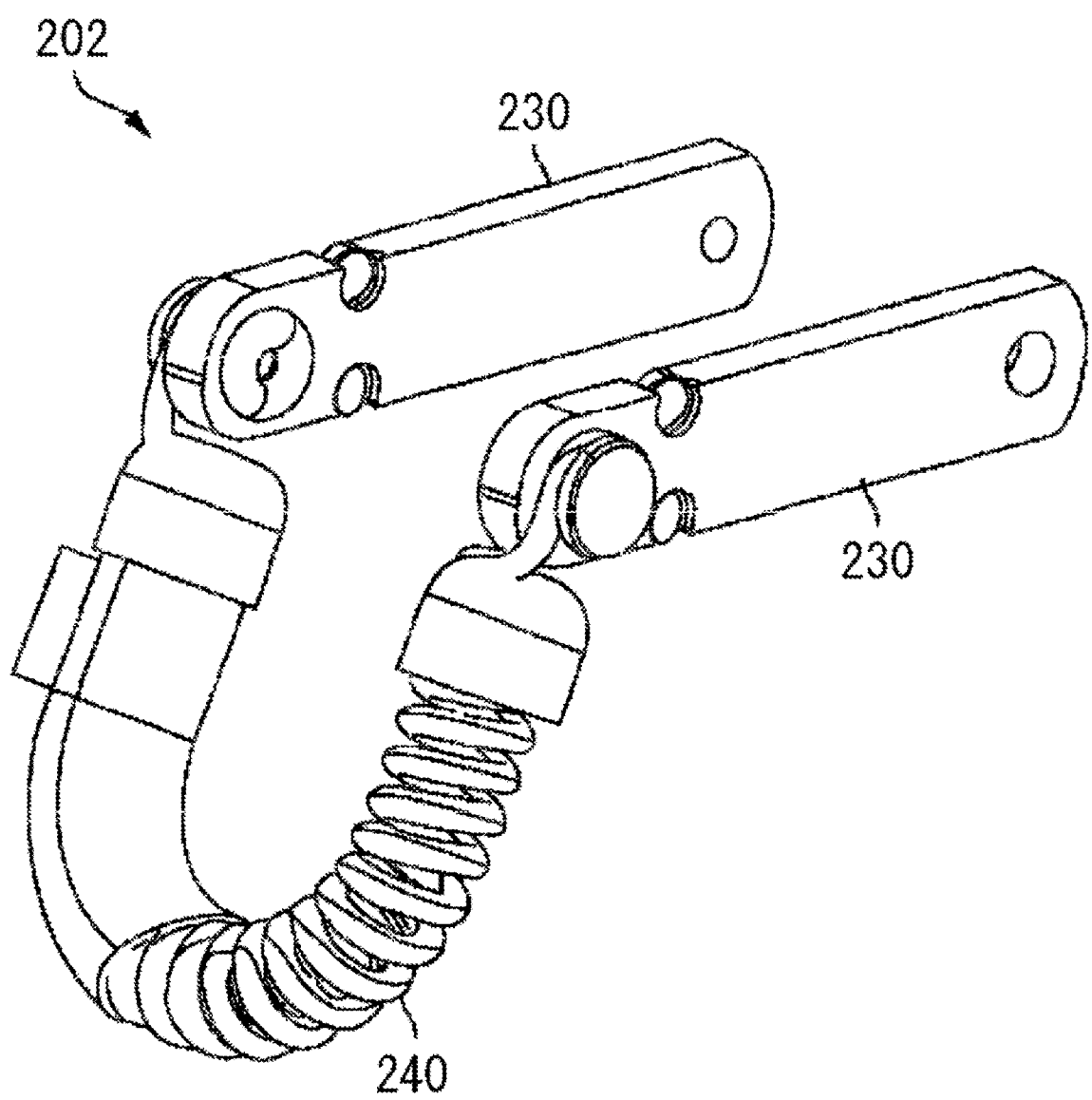
FIG. 12 is an overall perspective view of a strap with a known technique.

A second embodiment will now be described with reference to FIGS. 9 to 11. A hammer drill 101 according to the second embodiment includes an attachable hook 102 having a simpler shape than the hook for the hammer drill 1 according to the first embodiment. The components that are the same as or equivalent to those described in the first embodiment are given the same reference numerals in the drawings and will not be described repeatedly.

The hook 102 includes the hook body 20, the hook support 30, and a shock absorber. The hook support 30 rotatably supports the hook body 20. The shock absorber compresses between the hook body 20 and the hook support 30 to absorb shock. The shock absorber in the present embodiment is an elastic member. More specifically, the shock absorber in the present embodiment includes the elastic piece 35 and the compression spring 40. Unlike in the first embodiment, the hook support 30 in the second embodiment is substantially semicircular (refer to FIG. 11). The remaining substantially semicircular portion is thus on the battery mount 15. The hook support 30 is attached to the battery mount 15.

The hammer drill 101 according to the second embodiment produces the same advantageous effects as the hammer drill 1 according to the first embodiment. The hook support 30 in the second embodiment has a simpler structure than in the first embodiment.

The hammer drills 1 and 101 according to the above embodiments may have the structure partly modified as appropriate in the manner described below. For example, instead of combining the compression spring 40 and the elastic piece 35, the elastic member may include either the compression spring 40 or the elastic piece 35 alone. The elastic member may simply be one of a mechanical spring, a disc spring, and polyurethane, or any combination of at least two of these.

The hooks 2 and 102 in the above embodiments may include the second hook portion 22 located in a substantially middle area of the hook body 20 between its distal end and basal end to protrude inward. The relative positions of the first hook portion 21 and the second hook portion 22 may be reversed. In other words, the second hook portion 22 may be located on the distal end of the hook body 20, and the first hook portion 21 may be located in a substantially middle area of the hook body 20 between its distal end and basal end.

Although the compression uses the elastic member in the above embodiments, the compression may be achieved with air, gas, liquid, or another fluid. In the above embodiments, the hammer drill 1 is an example of a power tool, but may be any electric tool, air tool, or engine tool.

In the above embodiments, the second spring pin 26 is located in the linear portion 23, and the first notch groove 32b, the second notch groove 32c, and the flat portions 32d are located on the wall 32 of the hook support 30. In some embodiments, the first notch groove 32b, the second notch groove 32c, and the flat portions 32d may be located on the linear portion 23 of the hook body 20, and a protrusion corresponding to the second spring pin 26 may be located on the wall 32 of the hook support 30.

REFERENCE SIGNS LIST 1 hammer drill (power tool)
2 hook
10 body housing
11 motor housing
12 handle
14 hand grip
15 battery mount
16 drill bit
17 trigger
18 battery pack
19 screw hole
20 hook body
21 first hook portion
22 second hook portion
23 linear portion
24 spring stopper
25 first spring pin
26 second spring pin 30 hook support
30a attachment portion
30b insertion hole
31 opening
32 wall
32a through-hole
32b first notch groove
32c second notch groove
33 internal space
35 elastic piece (shock absorber, elastic member)
36 washer
40 compression spring (shock absorber, elastic member)
50 screw
X axis
Y center of gravity

The invention claimed is:
1. A hook, comprising:
a hook body including a basal end, a distal end and a middle portion, the basal end and the distal end are ends of the hook body on opposite sides of the middle portion;
a hook support including
an opening at a first end, and
a fixed wall at a second end;
an elastic member stopper attached to the basal end; and
an elastic member being compressible and between the elastic member stopper and the wall and configured to absorb shock on the hook body when the basal end moves axially relative to the hook support in a direction toward the middle portion and the distal end,
wherein the hook support supports the basal end such that the basal end, the distal end and the middle portion extend outwardly from the second end through the wall.
2. The hook according to claim 1, wherein
the elastic member includes an elastic piece and a compression spring.
3. The hook according to claim 2, wherein
the wall has a plurality of recesses,
the hook body includes a protrusion fittable into one of the plurality of recesses against an urging force of the elastic member, and
the hook body is rotatable relative to the hook support and positionable in a rotation direction by one of the plurality of recesses.
4. The hook according to claim 2, wherein
the hook body has a plurality of recesses,
the hook support has a protrusion fittable into one of the plurality of recesses against an urging force of the elastic member, and
the hook body is rotatable relative to the hook support and positionable in a rotation direction by one of the plurality of recesses.
5. The hook according to claim 2, wherein
the hook body includes a first hook portion and a second hook portion having a shape different from the first hook portion.
6. The hook according to claim 2, wherein
the hook support includes an attachment portion having an insertion hole to receive a screw.
7. The hook according to claim 1, wherein
the wall has a plurality of recesses,
the hook body includes a protrusion fittable into one of the plurality of recesses under an urging force of the elastic member, and
the hook body is rotatable relative to the hook support and positionable in a rotation direction by one of the plurality of recesses.
8. The hook according to claim 7, wherein
the hook body includes a first hook portion and a second hook portion having a shape different from the first hook portion.
9. The hook according to claim 7, wherein
the hook support includes an attachment portion having an insertion hole to receive a screw.
10. The hook according to claim 1, wherein
the hook body has a plurality of recesses,
the hook support has a protrusion fittable into one of the plurality of recesses against an urging force of the elastic member, and
the hook body is rotatable relative to the hook support and positionable in a rotation direction by one of the plurality of recesses.
11. The hook according to claim 10, wherein
the hook body includes a first hook portion and a second hook portion having a shape different from the first hook portion.
12. The hook according to claim 1, wherein
the hook body includes a first hook portion and a second hook portion having a shape different from the first hook portion.
13. The hook according to claim 12, wherein
a single bent wire comprises the first hook portion and the second hook portion.
14. The hook according to claim 1, wherein
the hook support includes an attachment portion having an insertion hole to receive a screw.
15. The hook according to claim 1, wherein the elastic member stopper is slidably received in the hook support.
16. A power tool, comprising:
a power tool body including
a body housing,
a motor housing attached to a lower portion of the body housing,
a hand grip attached to a rear portion to connect the body housing and the motor housing, and
a battery mount attached to a lower portion to connect the motor housing and the hand grip; and
a hook attachable to and detachable from the power tool body, the hook including
a hook body including a basal end, a distal end and a middle portion, the basal end and the distal end are ends of the hook body on opposite sides of the middle portion;
a hook support including
an opening at a first end, and
a fixed wall at a second end;
an elastic member stopper attached to the basal end; and
an elastic member being compressible and between the elastic member stopper and the wall and configured to absorb shock on the hook body when the basal end moves axially relative to the hook support in a direction toward the middle portion and the distal end;
wherein the hook support supports the basal end such that the basal end, the distal end and the middle portion extend outwardly from the second end through the wall.
17. The power tool according to claim 16, wherein
the hook support includes an attachment portion having an insertion hole configured to receive a fastener, and
the attachment portion is attachable to and detachable from the battery mount.

18. The power tool according to claim 16, wherein
the hook support has a substantially semicircular cross section, and
the battery mount has a substantially semicircular cross section to receive the hook support.

19. A hook, comprising:
a hook body including a basal end, a distal end and a middle portion, the basal end and the distal end are ends of the hook body on opposite sides of the middle portion;
a hook support including
 an opening at a first end, and
 a fixed wall at a second end;
an elastic member stopper attached to the basal end; and
an elastic member being compressible and between the elastic member stopper and the wall; wherein:
the hook support, the hook body and the elastic member are configured such that, when the basal end is moved axially relative to the hook support in a first direction toward the middle portion and the distal end, the elastic member exerts a force on the elastic stopper member in a second direction opposite the first direction; and
the hook support supports the basal end such that the basal end, the distal end and the middle portion extend outwardly from the second end through the wall.

* * * * *